United States Patent
Fujan et al.

(10) Patent No.: US 6,592,172 B2
(45) Date of Patent: Jul. 15, 2003

(54) DUMP BODY HAVING A PERIMETER BEAM FOR USE ON AN OFF-HIGHWAY RUBBER-TIRED HAULAGE VEHICLE

(75) Inventors: Steven J. Fujan, Tulsa, OK (US); William R. Borthick, Glenpool, OK (US)

(73) Assignee: Terex Corporation, Westport, CT (US)

( * ) Notice: Subject to any disclaimer, the term of this patent is extended or adjusted under 35 U.S.C. 154(b) by 0 days.

(21) Appl. No.: 10/152,595

(22) Filed: May 21, 2002

(65) Prior Publication Data

US 2002/0180240 A1 Dec. 5, 2002

Related U.S. Application Data

(60) Provisional application No. 60/294,144, filed on May 29, 2001.

(51) Int. Cl.[7] .............................. B62D 33/02; B60P 1/04
(52) U.S. Cl. ...................... 296/184; 298/1 R; 298/17 R
(58) Field of Search .................. 296/183, 184; 298/1 R, 17 R, 22 R, 7

(56) References Cited

U.S. PATENT DOCUMENTS

| | | | | |
|---|---|---|---|---|
| 1,139,456 A | * | 5/1915 | Ledwinka | 298/17 R |
| 1,190,429 A | * | 7/1916 | Ledwinka | 298/7 |
| 1,852,628 A | * | 4/1932 | Le Tourneau | 126/384.1 |
| 3,208,790 A | * | 9/1965 | Domes | 296/184 |
| 3,814,479 A | * | 6/1974 | Vornberger | 298/23 M |
| 4,194,787 A | * | 3/1980 | Williamsen | 298/23 M |
| 4,323,279 A | * | 4/1982 | Domes et al. | 298/23 DF |
| 4,325,444 A | * | 4/1982 | Anami | 180/346 |

FOREIGN PATENT DOCUMENTS

| | | |
|---|---|---|
| DE | 4212212 A1 | 10/1993 |
| DE | 29604009 U1 | 5/1996 |
| EP | 733511 A2 | 9/1996 |
| EP | 1213210 A1 | 12/2002 |
| GB | 2209139 A | 4/1989 |

OTHER PUBLICATIONS

International Search Report in International (PCT) Application No. PCT/US02/16279 dated Sep. 5, 2002.

* cited by examiner

Primary Examiner—D. Glenn Dayoan
Assistant Examiner—Patricia L. Engle
(74) Attorney, Agent, or Firm—Marshall, Gerstein & Borun

(57) ABSTRACT

A dump body for use on an off-highway rubber-tired haulage vehicle includes a floor, a pair of sidewalls, and a front wall. The floor includes a forward edge, a pair of side edges, and a rear edge generally defining a spillway. A plurality of load bearing beams are mounted to a bottom surface of the floor and are disposed generally parallel to and straddling a longitudinal axis of the floor. Each of the sidewalls includes a lower edge mounted to a corresponding one of the side edges of the floor, each sidewall further including a forward edge, a rearward edge, and a top edge. The front wall includes a bottom edge, a top edge, and a pair of side edges, with the bottom edge mounted to the forward edge of the floor. Each of the side edges of the front wall is mounted to the forward edge of one of the sidewalls. The floor, the pair of sidewalls, and the front wall defining a payload space, and the rear edge of the floor, the top edge of each of the sidewalls, and the top edge of the front wall cooperate to define a perimeter generally surrounding the payload space. A perimeter beam is mounted to and extends along the perimeter.

27 Claims, 6 Drawing Sheets

DUMP BODY HAVING A PERIMETER BEAM FOR USE ON AN OFF-HIGHWAY RUBBER-TIRED HAULAGE VEHICLE

RELATED APPLICATIONS

This application claims priority from U.S. Provisional Application Ser. No. 60/294,144, filed May 29, 2001.

FIELD OF THE INVENTION

The present invention relates generally to off-highway rubber tired haulage vehicles, such as dump trucks. More specifically, the present invention relates to an improved dump body for use on such dump trucks.

BACKGROUND OF THE INVENTION

Dump bodies for off-highway rubber tired haulage vehicles are typically constructed from a plurality of flat plates that have been welded together. According to common practice, dump bodies include a flat floor, flat sidewalls, and a flat front wall. Many times a cab protector, which is also flat, is attached to the top edge of the front wall in order to protect the truck cab during loading operations. A typical known prior art dump body is shown in FIG. 1.

It is known that flat plates are generally not well suited for carrying loads perpendicular to their surface. Although flat plates can be stiffened somewhat by increasing the thickness of the plates, in dump body applications merely thickening the plates is not a desirable option, as such an approach increases the weight of the dump body, thus lowering the hauling capacity of the haulage vehicle.

Accordingly, most dump bodies for the aforementioned haulage vehicles are constructed with flat plates which have been stiffened using a system of criss-crossing stiffeners on the external surfaces of each of the bottom wall, the sidewalls, the front wall and the cab protector. These stiffeners are designed to help distribute the loads carried by the dump body more evenly across the dump body structure. However, the multitude of stiffeners required again increases the weight of the dump body, and thus exacts the aforementioned haulage capacity penalty. Further, the many interconnecting stiffeners are costly and labor intensive to fabricate and weld in place, and many of the resulting connections may be subject to metal fatigue, thus shortening the effective service life of the dump body.

Accordingly, there exists a continuing need for improvements in dump body design.

DETAILED DESCRIPTION OF THE PREFERRED EMBODIMENT

Figure 1:
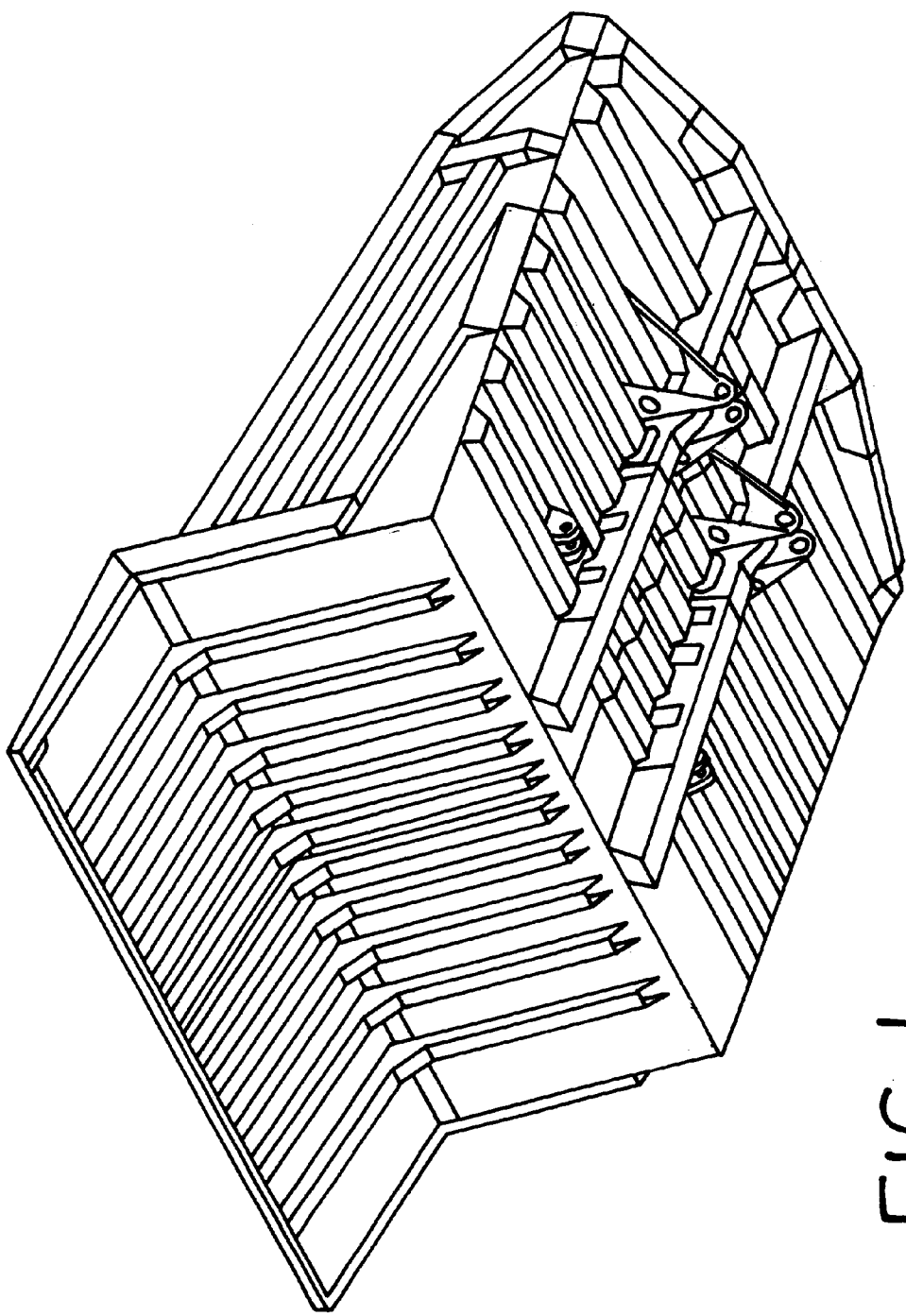
FIG. 1 is a perspective view taken from below of a prior art dump body.

The following description of the disclosed embodiment is not intended to limit the scope of the invention to the precise form or forms detailed herein. Instead, the following description is intended to be illustrative of the principles of the invention so that others may follow its teachings.

Referring now to FIGS. 2–5 of the drawings, a dump body assembled in accordance with the teachings of a first disclosed embodiment of the present invention is generally referred to by the reference numeral 10. It will be understood that the dump body 10, in a preferred environment of use, is for attachment to an off-highway rubber-tired haulage vehicle (not shown) or other suitable vehicles in which the dump body 10 may prove beneficial. However, the teachings of the invention are not limited to off-highway rubber-tired haulage vehicles or to any other particular environment of use.

The dump body 10 includes a floor 12, a pair of sidewalls 14, 16, and a front wall 18. The floor 12, the sidewalls, 14, 16, and the front wall 18 cooperate to generally define a payload space 20. Only the sidewall 14 is fully visible in FIG. 2. However, the sidewall 16 may be a mirror image of the shown sidewall 14. A tail gate (not shown) may also be provided.

Figure 2:
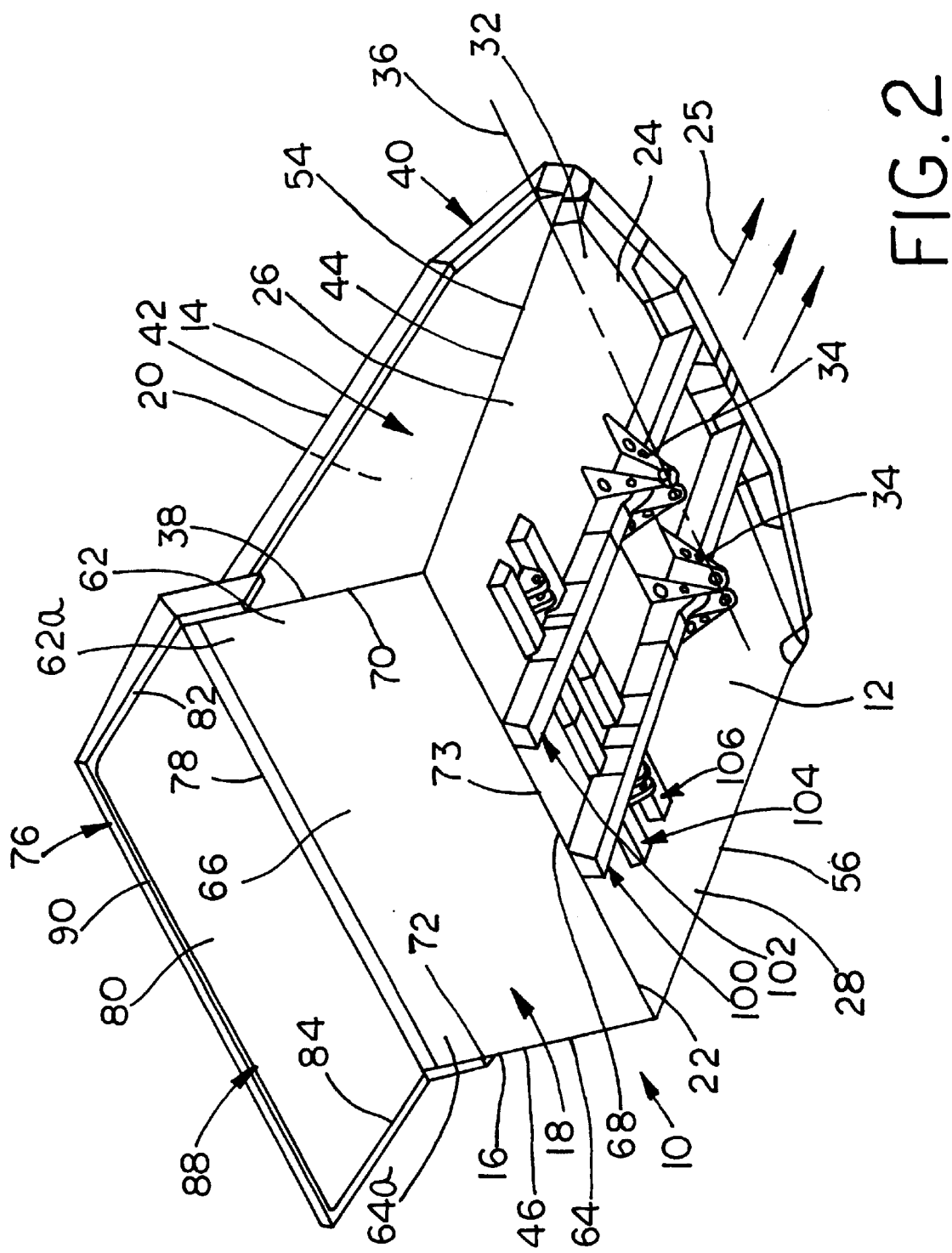
FIG. 2 is a perspective view taken from below of a dump body assembled in accordance with the teachings of the present invention.
Figure 3:
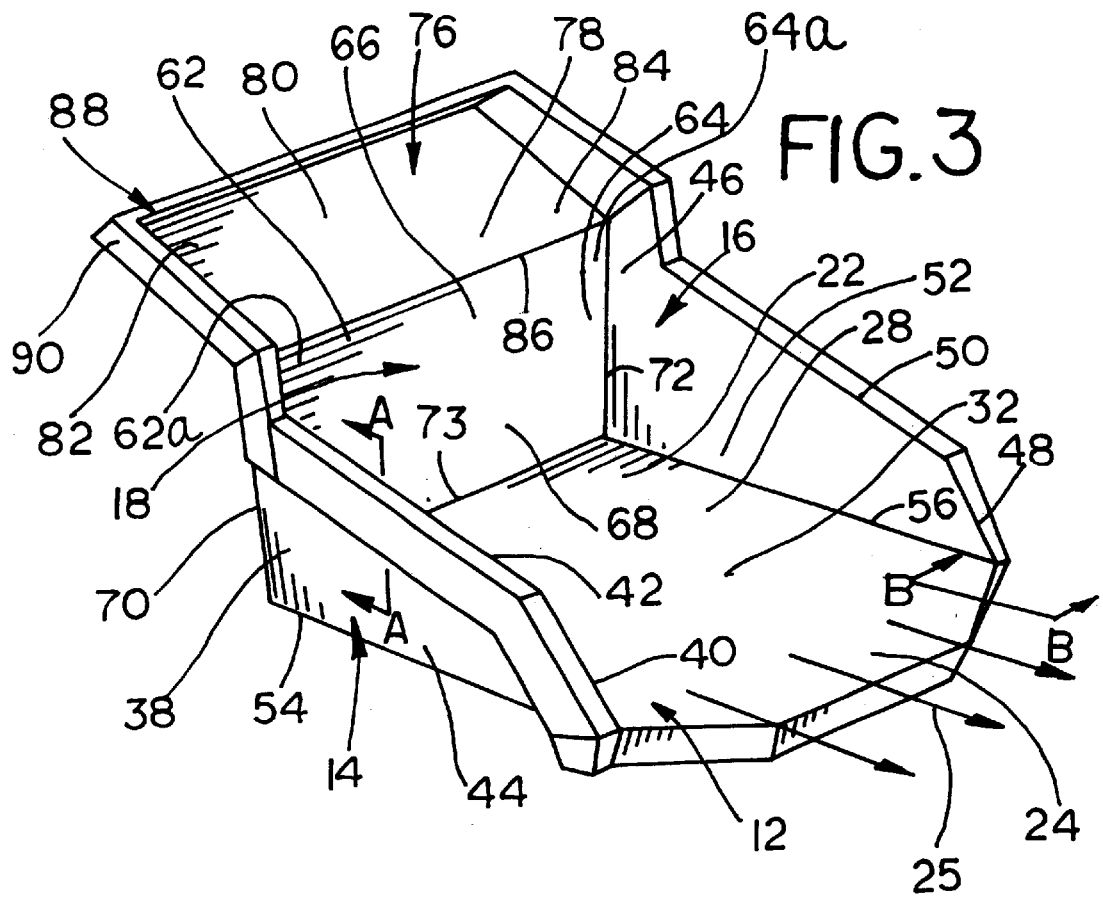
FIG. 3 is a perspective view taken from above of a dump body assembled in accordance with the teachings of the present invention.

Referring now to FIGS. 2 and 3, the floor 12 includes a forward edge 22 and a rearward edge 24, and a pair of interconnecting side edges 26, 28. The rearward edge 24 generally defines the rearward extent of a spillway 25. As shown in FIGS. 2 and 3, the floor 12 also includes a bottom surface 32. A plurality of pivot brackets 34 are provided which are secured to the bottom surface 32 of the floor 12. The number, location, and construction of the pivot brackets 34 would be known to those of skill in the art. The pivot brackets 34 are adapted to pivotally engage a portion of the dump truck (not shown) in a known manner, thereby permitting the dump body 10 to pivot about a pivot axis 36 (FIG. 2) in a known manner using conventional actuators (not shown).

Referring now to FIGS. 2 and 3, the sidewall 14 of the dump body 10 includes a forward edge 38, a rearward edge 40, and top and bottom edges 42, 44, respectively. The sidewall 16 of the dump body 12 includes a forward edge 46, a rearward edge 48, and top and bottom edges 50, 52, respectively. As shown in FIGS. 2 and 3, the lower edge 44 of the sidewall 14 meets the side edge 26 of the floor 12 along an elongated seam 54. Similarly, the lower edge 52 of the sidewall 16 meets the side edge 28 of the floor 12 along an elongated seam 56. Preferably, seams 54 and 56 are welded.

The front wall 18 includes a pair of side edges 62, 64 and top and bottom edges 66, 68. The side edge 62 meets the forward edge 38 of the sidewall 14 along a seam 70, while the side edge 64 meets the forward edge 46 of the sidewall 16 along a seam 72. The bottom edge 68 of the front wall 18 meets the forward edge 22 of the floor 12 along a seam 73. The seams 70, 72, and 73 are preferably welded, although other means of forming the seams may be used, such as bolts, rivets, or any other suitable fasteners.

A cab protector 76 may be provided. The cab protector 76 includes a rear edge 78, a front edge 80, and a pair of side edges 82, 84. The rear edge 78 is joined to the top edge 66 of the front wall 18 along a seam 86, such that the cab protector 76 extends in a generally forward direction from the top edge 66 of the front wall 18. The seam 86 is preferably welded.

The dump body 10 includes a perimeter 88 which generally surrounds the payload space 20. The perimeter 88 is defined at least in part by cooperating portions of the rearward edge 24 of the floor 12, the top edge 42 of the sidewall 14 (and perhaps a portion of the rearward edge 40 of the sidewall 14 depending on the extent of the slope of the sidewall 14), the top edge 50 of the sidewall 16 (and perhaps a portion of the rearward edge 48 of the sidewall 16 depending on the extent of the slope of the sidewall 16), an upper portion 62a of the side edge 62 of the front wall 18, an upper portion 64a of the side edge 64 of the front wall 18, the side edges 82, 84 of the cab protector 76, and the front edge of the cab protector 76. It will be understood that the perimeter 88 may be defined by additional or fewer edges and/or body components depending on the construction of the dump body 10. For example, if the dump body 10 does not include a cab protector, than a portion of the perimeter 88 will be defined in part by the top edge 66 of the front wall 18.

All or a portion of the perimeter 88 includes a perimeter beam 90 assembled in accordance with the teachings of the present invention. The perimeter beam 90 extends along the perimeter 88 and is joined to, or integrally formed with, each of the aforementioned edges that cooperate to form the perimeter 88.

Figure 4A:
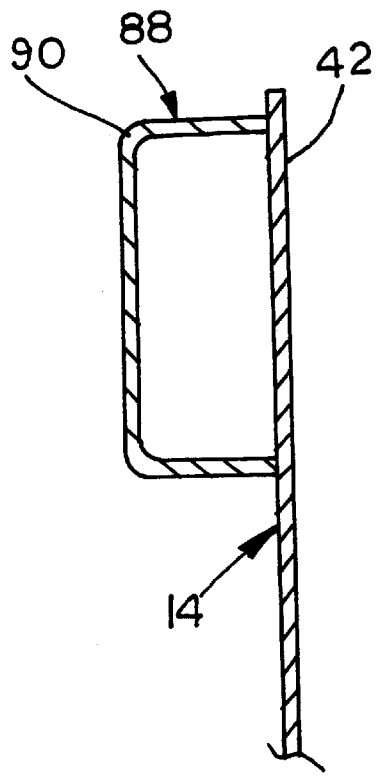
FIG. 4a is a cross-sectional view of a perimeter beam a dump body assembled in accordance with the teachings of the present invention, taken along the line A—A of FIG. 3.
Figure 4B:
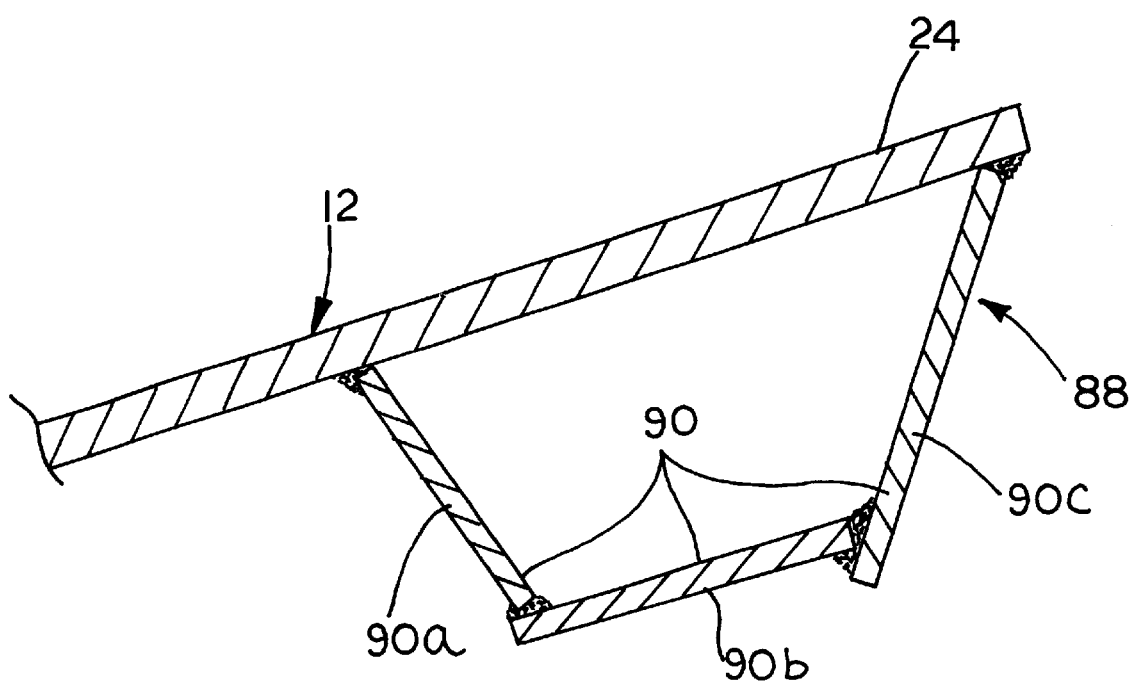
FIG. 4b is a cross-sectional view of a perimeter beam of a dump body assembled in accordance with the teachings of the present invention, taken along the line B—B of FIG. 3.

It will be understood that the perimeter 88 and perimeter beam 90 as in FIGS. 4a, 4b are illustrative only. Other configurations of the perimeter 88 may also be suitably provided.

Referring now to FIGS. 4a and 4b, there are shown two examples of an enlarged cross-sectional views of the perimeter 88 taken along lines A—A and B—B of FIG. 3. As illustrated in FIG. 4a, the perimeter beam 90 may be joined to the sidewall 14 along the top edge 42 to form the perimeter 88. Specifically, in the illustrated embodiment, perimeter beam 90 is a C-shaped section welded to the top edge 42 of the sidewall 14.

Turning to FIG. 4b, the perimeter beam 90 may be joined to the floor 12 along the rearward edge 24 to form the perimeter 88. In the illustrated cross sectional embodiment, the perimeter beam 90 may include three beam plates 90a, 90b, and 90c, welded together to form a C-shaped section. The perimeter beam 90 is then welded to the rearward edge 24 of the floor 12.

Figure 5:
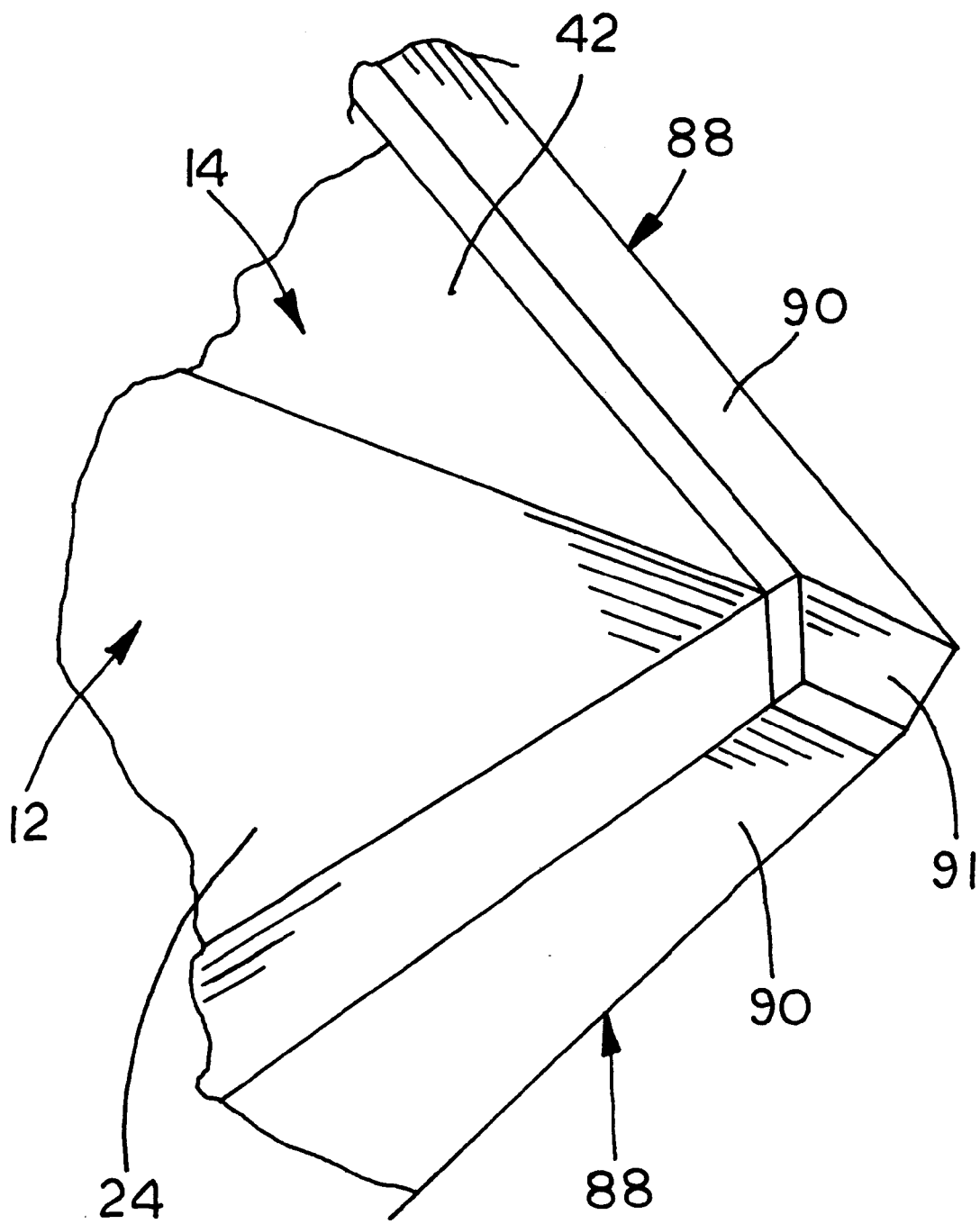
FIG. 5 is an enlarged perspective view taken about the circumscribed portion of FIG. 2 and showing an exemplary corner of a perimeter beam of a dump body assembled in accordance with the teachings of the present invention.

Referring now to FIG. 5, the perimeter 88 includes the perimeter beam 90 joined to the top edge 42 of the sidewall 14, the perimeter beam 90 joined to the rearward edge 24 of the floor 12, and a perimeter beam end cap 91 joining the two. Preferably, the perimeter beam end cap 91 is welded to both of the perimeter beams to form a contiguous unit. Other methods of joining the perimeter beam end cap 91 may also prove suitable.

Referring again to FIG. 2, in the disclosed example, the floor 12 includes a pair of stiffeners 100, 102 which extend generally transverse relative to the pivot axis 36. In the disclosed example, the pair of stiffeners 100, 102 are preferably box-shaped. Additional or fewer such stiffeners may be provided as needed. In the disclosed example it will be noted that the pivot brackets 34 are mounted to the floor 12 so as to generally intersect the stiffeners 100, 102.

Another pair of stiffeners 104, 106 may also be provided on the floor 12, with the stiffeners 104, 106 extending generally parallel to the axis of rotation 36 and transverse relative to the stiffeners 100, 102. The stiffeners 104, 106 may also be box-shaped stiffeners. Again, additional or fewer stiffeners may be used. In the disclosed example, the stiffeners 104, 106 will intersect the stiffeners 100, 102 and the stiffeners 100, 102, 104, and 106 will be a C-shaped section welded to the bottom face of the floor 12.

In operation, the dump body 10 is assembled by joining together the floor 12, the sidewalls 14, 16, and the front wall 18, along the seams 54, 56, 70, 72, 73. Preferably, such assembly may be by welding using conventional techniques. The cab protector 76, if used, may be joined to the front wall 18 along the seam 86, also by welding. Each of the floor 12, the sidewalls 14, 16, the front wall 18, and the cab protector 76 are preferably constructed of hardened steel plate, measuring in the disclosed embodiment abut 400 BHN (Brinnell Hardness Number) or better. The chosen material will also preferably have good notch toughness, similar to the notch toughness values commonly found on dump bodies. The stiffeners 100, 102, 104 and 106 are also welded to the bottom of the floor 12, as are the brackets 34. As stated above, although welding is the preferred method of assembly in the disclosed embodiment, suitable bolting arrangements may be substituted as would be within the capability of those of skill in the art.

It will be noted in the disclosed embodiment the sidewalls 14 and 16 each slope downwardly from the respective front edges toward their respective rear edges as can be seen in each of FIGS. 2 and 3. As an alternative, the sidewalls 14, 16 may have a greater or lesser slope, or no slope at all.

The dump body 10 is suitably mounted to a dump truck (not shown) in a conventional manner.

In the disclosed embodiment, when the dump body 10 is loaded, the payload exerts a forces on the floor 12, the sidewalls 14, 16 and the front wall 18. These forces are distributed within the structure of the dump body in a manner dependent on the stiffness of all of the members experiencing the load. In the disclosed embodiment, the perimeter beam 90 may distribute the load throughout the structure of the dump body 10 more efficiently. Accordingly, when assembled in accordance with the teachings of the present invention, the resulting dump body 10 will be lighter in weight as compared to prior art dump bodies, and yet will still have a favorable payload capacity relative to its light weight.

In order to further improve the performance of the dump body 10, the dump body 10 may also be provided with at least one of the floor 12, the sidewalls 14, 16, the front wall 18 and the cab protector 76 may be curved as outlined in co-pending and commonly assigned U.S. patent application Ser. No. 10/152,889, the entire disclosure of which is hereby incorporated herein by reference.

Figure 6:
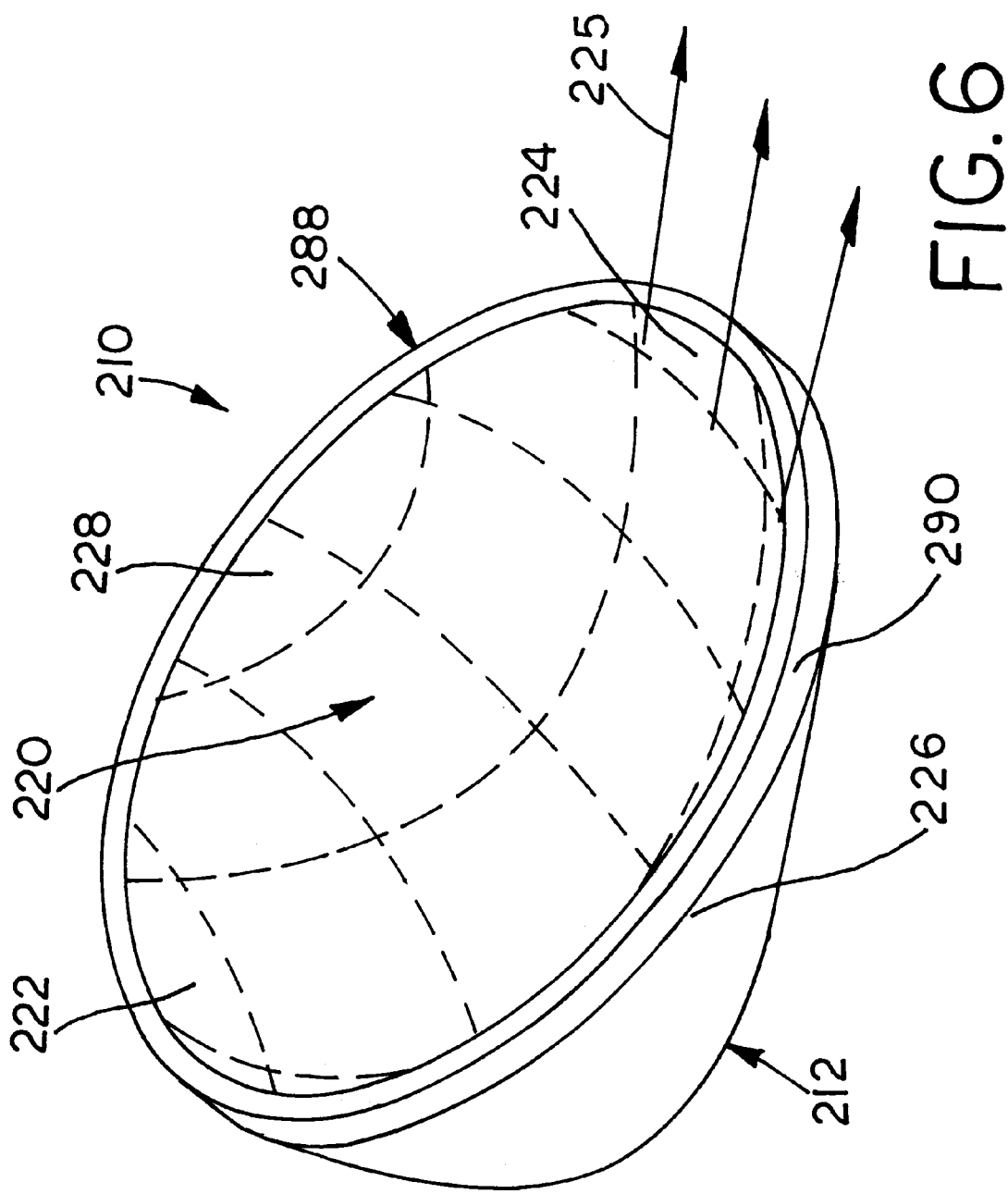
FIG. 6 is a perspective view taken from above of a dump body assembled in accordance with a second embodiment of the present invention.

Referring now to FIG. 6 of the drawings, a dump body assembled in accordance with the teachings of a second disclosed embodiment of the present invention is generally referred to by the reference numeral 210. The dump body 210 includes a curved, or spoon shaped floor 212 which generally defines a payload space 220. The floor 212 includes a forward curved portion 222, a rearward curved portion 224, and a pair of side curved portions 226 and 228. The rearward curved potion 224 generally defines the rearward extent of a spillway 225. Together, curved portions 222, 224, 226, 228 form a continuous edge portion of the floor 212. As described in connection with the previous embodiment, the floor 212 may include a plurality of pivot brackets (not shown) adapted to engage a portion of the dump truck (not shown) in a known matter, thereby permitting the dump body 210 to pivot about a pivot axis (not shown) in a known matter using conventional actuators (not shown).

The dump body 210 includes a perimeter 288 which generally surrounds the payload space 220. In the present embodiment, the perimeter 288 is defined at least in part by cooperating portion of the forward curved portion 222, the rearward curved portion 224, the side curved portion 226 and the side curved portion 228 of the floor 212. Again, it will be understood that the perimeter 288 may be defined by additional or fewer edges and/or body components depending on the construction of the dump body 210.

Similar to the previous embodiment, in the embodiment of FIG. 6, all or a portion of the perimeter 288 includes a perimeter beam 290. The perimeter beam 290 extends along the perimeter 288 and is joined to, or integrally formed with, each of the aforementioned edges that cooperate to form the perimeter 288.

Those skilled in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

What is claimed:

1. A dump body for use on an off-highway rubber-tired haulage vehicle, the dump body comprising:
   a floor, the floor having a forward edge, a pair of side edges, and a rear edge generally defining a spillway;
   a plurality of load bearing beams mounted to a bottom surface of the floor, the beams disposed generally parallel to and straddling a longitudinal axis of the floor;
   a pair of sidewalls, each of the sidewalls having a lower edge mounted to a corresponding one of the side edges of the floor, a forward edge, a rearward edge, a top edge, and an outer surface;
   a front wall, the front wall having a bottom edge, a top edge, and a pair of side edges, the bottom edge mounted to the forward edge of the floor, each of the side edges of the front wall mounted to the forward edge of one of the sidewalls;
   the floor, the pair of sidewalls, and the front wall defining a payload space, and wherein the rear edge of the floor, the top edge of each of the sidewalls, and the top edge of the front wall cooperate to define a perimeter generally surrounding the payload space;
   a perimeter beam mounted to and extending along the perimeter; and
   the outer surface of the sidewalls bounded in part by the perimeter beam, wherein the outer surface of the sidewalls are free of stiffeners.

2. The dump body of claim 1, wherein the front wall includes an outer surface, and wherein the outer surface of the front wall is bounded in part by the perimeter beam, and further wherein the outer surface of the front wall is free of stiffeners.

3. The dump body of claim 1, wherein the perimeter beam comprises a generally tubular member.

4. The dump body of claim 3, wherein the tubular member is generally rectangular.

5. The dump body of claim 1, wherein the bottom surface of the floor is adapted to be pivotally mounted to the haulage vehicle.

6. The dump body of claim 1, including at least one pivot bracket mounted adjacent to each of the load bearing beams.

7. The dump body of claim 6, wherein the pivot bracket defines a pivot axis, and wherein the bottom surface of the floor includes a forward portion disposed forward of the pivot axis and a rearward portion disposed rearward of the pivot axis, and further wherein the bottom surface of the floor includes at least one stiffener extending transversely relative to the longitudinal beams, the at least one stiffener mounted to only one of the forward portion of the floor or the rearward portion of the floor.

8. The dump body of claim 7, including only a pair of transverse stiffeners.

9. The dump body of claim 1, the haulage vehicle including a pair of tilt actuators, and wherein the dump body includes a pair of actuator brackets, each of the actuator brackets adapted to engage one of the tilt actuators, and further wherein the bottom surface of the floor includes at least one transverse stiffener mounted to the bottom surface of the floor, the at least one transverse stiffener extending generally perpendicular to the longitudinal axis of the floor.

10. The dump body of claim 9, including only a pair of transverse stiffeners.

11. The dump body of claim 9, wherein the transverse stiffener extends approximately ten to one hundred percent of the width of the bottom surface of the floor.

12. The dump body of claim 1, further including a cab protector having a rear edge joined to the top edge of the front wall, the cab protector extending generally in a forward direction from the front wall, the cab protector including a front edge and a pair of side edges, the front wall and the side edges of the cab protector defining a portion of the perimeter.

13. A dump body for use on an off-highway rubber-tired haulage vehicle, the dump body having a longitudinal axis and comprising:
   a floor adapted for pivotal attachment to the haulage vehicle thereby permitting pivotal movement of the dump body about a pivot point, the floor having a forward edge, a rearward edge, and a pair of side edges;
   a pair of sidewalls, each of the sidewalls having an upper edge, a lower edge, a forward edge, a rearward portion, and an outer surface, the lower edge of each of the sidewalls joined to the floor along a corresponding one of the side edges of the floor;
   a front wall joined to the forward edge of the floor and to the forward edge of each of the sidewalls;
   a cab protector having a rear edge, the rear edge joined to the top edge of the front wall so that the cab protector extends in a generally forward direction relative to the front wall, the cab protector further having a front edge and a pair of side edges;
   wherein the floor, the sidewalls, and the front wall cooperate to define a payload space, and further wherein rear edge of the floor, the top edges of the sidewalls, an upper portion of each of the side edges of the front wall, and the front edge and the side edges of the cab protector cooperate to define a perimeter;
   a perimeter beam mounted to the perimeter; and
   wherein the outer surface of the sidewalls is bounded in part by the perimeter beam, and further wherein the outer surface the sidewalls are free of stiffeners.

14. The dump body of claim 13, wherein the front wall includes an outer surface, the outer surface of the front wall is bounded in part by the perimeter beam, and further wherein the outer surface of the front wall is free of stiffeners.

15. The dump body of claim 13, wherein the perimeter beam comprises a generally tubular member.

16. The dump body of claim 13, including a pair of load bearing beams mounted to a bottom surface of the floor and extending generally parallel to and straddling the longitudinal axis, and further including at least one pivot bracket mounted adjacent to each of the load bearing beams.

17. The dump body of claim 16, the haulage vehicle including a pair of tilt actuators, and wherein the bottom surface of the floor includes pair of actuator brackets, each of the actuator brackets adapted to engage one of the tilt actuators, and further wherein the bottom surface of the floor includes at least one transverse stiffener mounted to the bottom surface of the floor adjacent the actuator brackets, the at least one transverse stiffener extending generally perpendicular to the longitudinal axis.

18. The dump body of claim 17, wherein the transverse stiffener extends approximately ten to one hundred percent of the width of the bottom surface of the floor.

19. The dump body of claim 16, wherein the dump body is adapted to pivot about a pivot axis, and wherein the at least one transverse stiffener is disposed forwardly of the pivot axis.

20. The dump body of claim 19, including only a pair of transverse stiffeners.

21. A dump body for use on an off-highway rubber-tired haulage vehicle, the dump body comprising a panel system, the panel system defining a payload space, the payload space including an open top, a rear spillway, and a perimeter portion, the perimeter portion defined at least in part by cooperating edge portions of a stiffened floor, a pair of sidewalls, a front wall, and a cab protector, the sidewalls, the front wall, and the cab protector being free of surface mounted stiffeners, and perimeter reinforcing means for reinforcing the dump body, the perimeter reinforcing means carried exclusively by the cooperating edge portions of the stiffened floor, the pair of sidewalls, the front wall, and the cab protector.

22. A dump body for use on an off-highway rubber-tired haulage vehicle, the dump body comprising:
- a floor, the floor having a pair of side edges extending between a forward edge and a rearward edge, the floor further having a stiffened bottom surface including a pair of longitudinally extending load bearing beams and a plurality of transverse stiffeners disposed generally perpendicular to the load bearing beams, the floor further including a pair of pivot brackets, the transverse stiffeners disposed forwardly of the pivot brackets such that a rearward portion of the floor located rearward of the pivot brackets is free of transverse stiffeners;
- a pair of sidewalls, each of the sidewalls having a bottom edge joined to a corresponding one of the side edges of the floor, each of the sidewalls further having a front edge and a sloping top edge; and
- a front wall, the front wall having a bottom edge joined to the forward edge of the floor and having side edges joined to the front edge of one of the sidewalls, the front wall further having a top edge;
- a cab protector joined to the top edge of the front wall;
- the floor, the sidewalls, and the front wall cooperating to define a payload space having a perimeter, a portion of the perimeter defined by the cab protector; and
- a reinforcing perimeter beam mounted to the perimeter;
- whereby the cab protector, the front wall, and the sidewalls are stiffened exclusively by the perimeter beam.

23. A dump body for use on an off-highway rubber-tired haulage vehicle, the dump body comprising:
- a floor, the floor having a pair of side edges extending between a forward edge and a rearward edge;
- a pair of sidewalls, each of the sidewalls having a bottom edge joined to a corresponding one of the side edges of the floor, each of the sidewalls further having a top edge;
- a front wall joined to the forward edge of the floor and to a forward edge of each of the sidewalls, the front wall having a bottom edge and a top edge;
- the floor, the sidewalls, and the front wall cooperating to define a payload space, and further wherein the floor, the sidewalls, and the front wall cooperate to define at least a portion of a perimeter surrounding the payload space; and
- a reinforcing system, the reinforcing system including:
  - a beam mounted to the perimeter; and
  - floor stiffening means, wherein the floor stiffening means includes a pair of longitudinally extending load beams, the load beams supporting pivot brackets, and wherein the floor stiffening means is free of transverse stiffeners disposed rearwardly of the pivot brackets.

24. A dump body for use on an off-highway rubber-tired haulage vehicle and comprising at least one payload panel, the at least one payload panel defining a payload space, the payload space including an open top, a rear spillway, and a perimeter portion, the perimeter portion defined at least in part by cooperating edge portions of the at least one payload panel, and perimeter reinforcing means for reinforcing the dump body, the perimeter reinforcing means carried exclusively by the cooperating edge portions of the at least one payload panel wherein the at least one payload panel comprises:
- a floor panel, the floor panel having a pair of side edges extending between a forward edge and a rearward edge, the floor panel further having a stiffened bottom surface including a pair of longitudinally extending load bearing beams and a plurality of transverse stiffeners disposed generally perpendicular to the load bearing beams, the floor panel further including a pair of pivot brackets, the transverse stiffeners disposed forwardly of the pivot brackets such that a rearward portion of the floor located rearward of the pivot brackets is free of transverse stiffeners;
- a pair of sidewall panels, each of the sidewall panels having a bottom edge joined to a corresponding one of the side edges of the floor panel, each of the sidewall panels further having a front edge and a sloping top edge; and
- a front wall panel, the front wall panel having a bottom edge joined to the forward edge of the floor panel and having side edges joined to the front edge of one of the sidewall panels.

25. The dump body of claim 24, wherein the at least one payload panel comprises a curved load carrying panel, the curved panel having a continuous edge portion defining the perimeter portion, the curved panel further including a pair of pivot brackets.

26. A dump body for use on an off-highway rubber-tired haulage vehicle, the dump body comprising:
- a spoon-shaped payload panel, the spoon-shaped payload panel having a continuous edge portion defining a payload space, the payload space including an open top, a rear spillway, and a perimeter portion, the perimeter portion defined by the continuous edge portion of the spoon-shaped payload panel; and
- perimeter reinforcing means for reinforcing the dump body, the perimeter reinforcing means carried exclusively by the cooperating edge portions of the spoon-shaped payload panel.

27. The dump body of claim 26, wherein the spoon-shaped payload panel further comprises a pair of pivot brackets.

* * * * *

UNITED STATES PATENT AND TRADEMARK OFFICE
CERTIFICATE OF CORRECTION

PATENT NO. : 6,592,172 B2
DATED : July 15, 2003
INVENTOR(S) : Steven J. Fujan et al.

It is certified that error appears in the above-identified patent and that said Letters Patent is hereby corrected as shown below:

Column 6,
Line 60, please delete "surface the" and insert instead -- surface of the --.

Column 7,
Line 7, please delete "includes pair" and insert instead -- includes a pair --.

Signed and Sealed this

Twentieth Day of April, 2004

JON W. DUDAS
*Acting Director of the United States Patent and Trademark Office*